Patented May 1, 1945

2,374,648

UNITED STATES PATENT OFFICE 2,374,648

CONDENSATION PRODUCTS OF N,N'-BIS (ALKOXYMETHYL) UREA AND PROCESSES FOR THEIR PRODUCTION

William J. Burke, Marshallton, and James H. Werntz, Wilmington, Del., assignors to E. I. du Pont de Nemours & Company, Wilmington, Del., a corporation of Delaware No Drawing. Application November 21, 1942, Serial No. 466,472

6 Claims. (Cl. 260—2)

This invention relates to new condensation products and more particularly refers to new derivatives of diamides having a variety of uses in the industrial arts and processes for their production.

There occur in nature certain materials which display surface-tension modifying properties and which have been used to a limited extent as emulsifying agents and protective colloids. Such products are relatively costly, difficult to isolate in pure form, and unsuitable for many of the applications of modern industry which employ surface-tension modifying agents. Solubility in water of this non-ionic type of agent, however, does not depend on anionic or cationic solubilizing groups and it is therefore substantially unaffected by the presence of salts such as may be present in hard water and of acids and bases, for example, the ones customarily employed in textile-treating operations. Recognizing that a synthetic product of this type will enjoy a wider field of usefulness than the naturally occurring materials, earlier investigators have sought to prepare emulsifying agents by modifying certain polyethers and certain polyhydroxy compounds which are obtainable from sugars by the introduction of suitable organic radicals. These investigations served to confirm the utility of the non-ionic type of surface-tension modifying agent and to emphasize its superiority to soap, especially in hard water. However, the commercial scope of these prior developments has been limited by the high cost and relative scarcity of suitable intermediates. Furthermore, the development and commercial utilization of synthetic non-ionic detergents and emulsifying agents has been seriously hampered by the lack of practical methods of manufacture which have been limited both in scope and in yield performance. Hence, the discovery of a novel and practical synthesis of non-ionic surface-tension modifying agents from low-cost readily available raw materials according to the process of this invention comprises an important and valuable advance in the field of surface-active chemistry.

It is an object of this invention to produce new non-ionic surface-tension modifying products. A further object is to produce new condensation polymers which have a variety of uses in the industrial arts, particularly as assistants for the textile and related industries. A still further object is to produce a new class of surface-active agents which may be used alone, in admixture with one another, and/or in admixture with the numerous surface-active agents of the prior art. A still further object is to produce a new class of surface-active agents which are free from many disadvantages of prior art agents of this type. A still further object is to produce a new class of condensation polymers by means of a simple and expeditious process employing a variety of reactants which are relatively cheap and readily available. Additional objects will become apparent from a consideration of the following description and claims.

These objects are attained in accordance with the present invention wherein an N,N'-bis(alkoxymethyl) derivative of a diamide is reacted with an organic compound substituted with two or more hydroxyl groups and said reaction is carried out in the presence of a third organic compound containing at least eight carbon atoms and at least one hydrogen atom which is directly attached to oxygen, nitrogen or sulfur. In a more restricted sense this invention is concerned with a process which comprises reacting an N,N'-bis(alkoxymethyl) derivative of a diamide containing less than seven carbon atoms with a monomeric polyhydric alcohol and the third component referred to in the preceding sentence. In a still more restricted sense this invention is concerned with the reaction of N,N'-bis(alkoxymethyl)-urea with a glycol and a monofunctional organic compound having from eight to eighteen carbon atoms and further having a hydrogen atom which is attached to oxygen, nitrogen or sulfur. In a preferred embodiment, this invention is directed to the reaction of bis(methoxymethyl)urea with a glycol and a monosulfonamide derived from petroleum hydrocarbons of at least eight carbon atoms. In another preferred embodiment the invention is concerned with the reaction of bis(methoxymethyl)urea with diethylene glycol and an aliphatic monohydric alcohol of from eight to eighteen carbon atoms. Additional embodiments of the invention comprise carrying out the foregoing reactions under carefully controlled conditions and with specific amounts of the individual reactants. Still further embodiments of the invention comprise the condensation products produced in accordance with each of the foregoing processes. Still further embodiments of this invention pertain to the use of these products in the industrial arts generally and the textile and related arts specifically.

Water soluble polymers are obtained by reacting a monomeric polyhydric alcohol with N,N'-bis(alkoxymethyl) derivatives of diamides of the structure ROCH$_2$NHR'.NHCH$_2$OR in which R is the nonhydroxy portion of a monohydric alcohol boiling below 210° at 760 mm. and the bivalent radical R' is the residue of a diamide such as urea. By including in the reaction mixture an organic compound which contains at least one functional group and is capable of reacting with these N,N' alkoxymethyl compounds, modified condensation polymers are obtained. When the modifying organic compound contains 8 or more carbon atoms and is used in suitable proportions new water-soluble products are obtained which possess useful surface-active properties.

Certain probable reactions have been postulated to explain the formation of a product obtained by this invention. By way of illustration only and imposing no limitation whatsoever, the following reactions are presented, recognizing that no structural data are available and that the products are probably of greater complexity than indicated. Bis(methoxy-methyl)urea probably reacts with an equimolecular quantity of ethylene glycol as follows:

XCH$_3$OCH$_2$NHCONHCH$_2$OCH$_3$+XHOCH$_2$CH$_2$OH ⟶

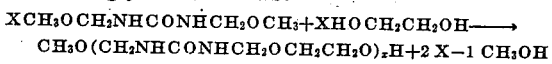

Now if one mole of dodecanol-1 for each 5 moles of bis(methoxymethyl)urea and ethylene glycol is included in the reaction mixture a probable reaction mechanism is as follows:

C$_{12}$H$_{25}$OH+5CH$_3$OCH$_2$NHCONH—CH$_2$OCH$_3$+
5HOCH$_2$CH$_2$OH ⟶

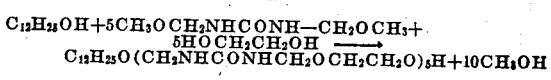

On the other hand, two moles of dodecanol-1, 9 moles ethylene glycol and 10 moles bis(methoxymethyl)urea may react as follows:

2C$_{12}$H$_{25}$OH+10CH$_3$OCH$_2$NHCONHCH$_2$OCH$_3$+9HOCH$_2$CH$_2$OH ⟶

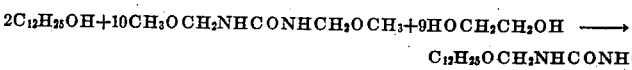

Regardless of the actual proportions employed, the products probably consist of each of the indicated types. Many of the products of this invention may be described as condensation polymers of 40−X moles of a monomeric polyhydric alcohol, 40 moles of a N,N'-bis(alkoxymethyl) derivative of a diamide and 1-20 moles of an organic compound of 8 or more carbon atoms having a labile hydrogen atom in which X is a whole number ranging from 0 to 20.

In accordance with this invention, the general procedure for preparing these new non-ionic surface-active polymers is to heat the reactants with or without a catalyst under conditions such that the low molecular weight alcohol which is formed can be removed from the reaction mixture. The conditions used vary considerably with the type of modifying compound used and the monomer being polymerized. Glycols react readily in the absence of a catalyst. However, it is frequently desirable to accelerate the rate of reaction or to carry out the reaction at a lower temperature and the condensation is then conducted in the presence of a small amount of an acid or acidic salt as catalyst and under such conditions that the alcohol formed will be removed from the sphere of reaction as rapidly as possible. This is conveniently done by carrying out the reaction in the presence of a catalyst at a temperature above the boiling point of the low molecular weight alcohol, such as methanol, and with nitrogen or other inert gas bubbling through the reaction mixture to carry off the alcohol as rapidly as it is formed. The preferred proportions usually employed are equimolecular amounts of the N,N'-bis(alkoxymethyl) compounds and a glycol plus 0.5–0.025 mole of an organic compound of 8 or more carbon atoms having at least one labile hydrogen atom.

The products of this invention range from oils and soft resins to fatty or wax-like solids. Their solubility characteristics depend upon the kind and length of the polymer chain formed and upon the nature of the modifying organic compound. The solutions and emulsions, respectively, are stable to weak acids and alkalis and the agents causing hardness in water. The preferred products are, generally speaking, soluble or readily dispersible in water and in organic solvents, such as ethyl alcohol, acetone, benzene, ethylene dichloride, textile finishing oils, ethyl ether, petroleum ether, white mineral oil, castor oil, etc.

The invention may be more readily understood by a consideration of the following illustrative examples, wherein the quantities are stated in parts by weight.

EXAMPLE I

*Bis(methoxymethyl) urea-diethanolamine polymer modified with dodecanol-1*

Seventy-four parts bis(methoxymethyl)urea, 53 parts diethanolamine, 19 parts dodecanol-1 were heated together on the steam bath while agitating with a stream of nitrogen gas. After heating about 1 hour the condensation product was a viscous oil. It gave sudsing solutions in water and in dilute acetic acid.

In place of diethanolamine one may employ triethanolamine, N-methyl diethanolamine, N-butyl diethanolamine, phenyl diethanolamine, 2-methyl-2-amino propylene glycol, tris(hydroxymethyl)aminomethane, etc. In place of dodecanol-1 one may use octanol-1, hexadecanol-1, octadecanol-1, octadecene-9,10-ol-1, pentadecanol-8, heptadecanol-9 or the related tertiary alcohols. Technical mixtures of alcohols obtainable by the carboxylic reduction of coconut oil, sperm oil, lard oil, beef tallow, castor oil, peanut oil, drying oils, etc. may be employed. The higher alcohols obtainable as by-products in the synthesis of methanol by catalytic processes may also be used.

EXAMPLE II

*Bis(methoxymethyl) urea-diethylene glycol polymer modified with a white oil sulfonamide*

Seventy-four parts bis(methoxymethyl)urea, 53 parts diethylene glycol and 29.1 parts of a white oil sulfonamide were heated together on the steam bath while blowing with nitrogen gas. After heating 2.5 hours the condensation product was a brown, elastic, chicle-like polymer. It dissolved in water to give slightly cloudy, sudsing solutions.

Ten parts of the above condensation product and 1 part of ammonium chloride were dissolved in 200 parts of water and the solution applied by padding to a piece of gabardine cloth. The treated fabric was dried by heating at 170° C. in a forced draft oven for 3 minutes. This treatment served to insolubilize the finishing agent since the treated fabric was now water repellent.

The white oil sulfonamide was obtained by treating with ammonia the sulfonyl chloride prepared from white oil by the process described in Reissue Patent No. 20,968. White oil is a petroleum fraction, boiling within a certain range, which has been refined by an acid washing treatment. The product referred to herein is the same as that described in U. S. Patent No. 2,197,800 at page 3, column 2, lines 49-68, where it is stated that, "the distillation range specified will cover only those straight chain or normal hydrocarbons of about 13-20 carbon atoms." The white oil sulfonamide analyzed 4.7% nitrogen, 9.7% sulfur, 2.1% chlorine and had an estimated molecular weight of 291.

The above condensation product in which the molar proportions of reactants bis(methoxymethyl)urea/diethylene glycol/white oil sulfonamide were 5/5/1 gave aqueous solutions which sudsed more persistently than a condensation product in which the proportions were 7/7/1.

In place of the sulfonamide derived from white oil by the above referred to process one may employ similar products derived from other saturated aliphatic hydrocarbons such as kerosene fractions, paraffin wax, alicyclic hydrocarbons, etc.

Sulfonamides derived from thiols can also be employed. For example, the mixture of alcohols obtainable by the carboxylic reduction of coconut oil was converted to a mixture of alkyl chlorides, then to a mixture of alkyl thiols, then to a mixture of alkyl sulfonyl chlorides, and finally to a mixture of alkyl sulfonamides. Ten parts of this mixture of sulfonamides, 29.6 parts bis(methoxymethyl)urea, 21.2 parts diethylene glycol were stirred together while blowing with nitrogen gas. After heating on the steam bath about 2 hours about 13.0 parts of volatile by-products had been removed. The condensation product gave strongly sudsing solutions in water. Sulfonamides may also be employed which may be derived from the thiols and mixtures of thiols which contain the hydrocarbon radicals disclosed for the alcohols in Example I.

Example III

*Bis(methoxymethyl)urea-diethylene glycol polymer modified with dodecanol-1*

One mol bis(methoxymethyl)urea, 0.9 mol diethylene glycol, 0.2 mol dodecanol-1 were heated together at 120-130° C. while agitating with a stream of nitrogen gas. After heating about 30 minutes the condensation product was a soft, clear, viscous resin. It dissolved readily in cold water to yield sudsing solutions.

A product with similar properties was obtained by heating on the steam bath for one hour a mixture of 1 mol bis(methoxymethyl)urea, 1 mol diethylene glycol and 0.1 mol dodecanol-1.

In place of dodecanol-1 one may use other alcohols, examples of which are disclosed in Example I. In place of alcohols one may also use acids, examples of which are caproic acid, palmitic acid, stearic acid, oleic acid, diheptylacetic acid, etc. Technical mixtures of acids occurring in coconut oil, sperm oil, beef tallow, castor oil, peanut oil, drying oils, etc. may also be employed. The higher acids obtainable by the oxidation of petroleum hydrocarbons and waxes may also be used.

Example IV

*Bis(methoxymethyl)urea-diethylene glycol polymer modified with 1-dodecylthiosorbitol*

One mol bis(methoxymethyl)urea, 0.9 mol diethylene glycol, and 0.2 mol 1-dodecylthiosorbitol were heated at 120-130° C. while agitating with a stream of nitrogen gas. After heating 20 minutes the product was a viscous resin, soluble in water to yield sudsing solutions.

In place of the long-chain thioethers derived from thiosorbitol one may employ the long-chain mono- and diethers of glycerin such as monododecyl glyceryl ether. One may also use monolaurin, monostearin and technical mixtures of monoglycerides obtained from sperm oil, beef tallow, castor oil, peanut oil, drying oils, etc.

Example V

*Bis(methoxymethyl)urea-diethylene glycol polymer modified with hexadecane-1-thiol*

One mol bis(methoxymethyl)urea, 0.9 mol diethylene glycol, 0.2 mol hexadecane-1-thiol were heated at 120-130° C. while agitating with a stream of nitrogen gas. After heating 30 minutes the product was a soft, viscous resin. It was soluble in water to yield strongly sudsing solution.

In place of hexadecane-1-thiol, one may employ the thiols or mixtures of thiols which contain the hydrocarbon radicals disclosed for the alcohols in Example I.

Example VI

*Bis(methoxymethyl)urea-diethylene glycol polymer modified with stearamide*

One mol stearamide, 5 mols diethylene glycol, 5 mols bis(methoxymethyl)urea were heated on the steam bath while agitating with a stream of nitrogen gas. After heating 3.5 hours the product was a soft, white solid. It gave sudsing dispersions in water.

Similar product was obtained in 30 minutes when a small amount of ammonium chloride was included in the reaction mixture. This product was not quite as soluble in water as the above condensation product in which no catalyst was employed.

In place of stearamide one may employ lauric amide, caprylic amide, palmitic amide, the amide of diheptylacetic acid, etc. Technical mixtures of amides obtainable from the mixtures of acids occurring in coconut oil, sperm oil, beef tallow, castor oil, peanut oil, drying oils, etc. may also be used. The amides of the higher acids obtainable by the oxidation of petroleum hydrocarbons and waxes may also be employed. Ureides and monosubstituted amides such as N-methyl lauramide may be used.

In place of amides one may also use amines such as N-dodecylamine, N-octylamine, N-hexadecylamine, N-octadecylamine, N-oleylamine, pentadecyl-8-amine, or related secondary amines such as N-octyl-N-methylamine, dioctylamine, etc. Technical mixtures of amines derived from the mixture of acids occurring in coconut oil, sperm oil, beef tallow, castor oil, peanut oil, drying oils, etc. may also be employed. Catalysts are usually required when amines are employed as the modifying agents.

Example VII

*Bis(methoxymethyl)urea-diethylene glycol polymer modified with methylol stearamide*

Five mols methylol stearamide, 25 mols diethylene glycol and 25 mols of bis(methoxymethyl)urea were heated at 120-130° C. for 30 minutes and then at 100° C. for 30 minutes. The product was a soft, white solid which gave sudsing dispersions in water.

In place of methylol stearamide one may employ the methylolamides formed by reaction of formaldehyde with the amides disclosed in Example VI.

It is to be understood that the foregoing examples are representative merely of a few of the many modifications to which this invention is susceptible. They may be varied widely with respect to the individual reactants, the proportions thereof, and the conditions of reaction, without departing from the scope hereof.

The bis(alkoxymethyl) compounds employed in this invention have the structure

in which R is the nonhydroxy portion of a monohydric alcohol boiling below 210° C. at 760 mm. and is preferably a hydrocarbon radical. The alcohols corresponding to the radicals R include methyl, ethyl, propyl, isopropyl, butyl, isobutyl, amyl, hexyl, octyl, benzyl, furfuryl, tetrahydrofurfuryl, methoxyethyl, ethoxyethyl alcohols, and in general any monohydric alcohol boiling below 210° C. at 760 mm. For the purposes of this invention these alcohols should advisably be more volatile than the modifying organic compound and in general methyl alcohol is preferred since it is readily removed. The bivalent radical R' is the residue of a diamide and preferably of 8 or less carbon atoms since with higher content of carbon the condensation products have too low solubility in water. While urea is the preferred diamide, thiourea may also be used. Diamides of the following dibasic acids may also be employed: Adipic, succinic, maleic, malonic, oxalic, phthalic, etc.

In general, glycols of the formula HOR'OH in which R' is a divalent radical having the two OH groups attached to different aliphatic carbon atoms and not containing other reactive groups are preferred for use as polymer ingredients. However, aromatic residues may form part of a molecule provided the hydroxyl groups are attached to aliphatic carbon atoms. Heteroatoms such as oxygen, sulfur, NH and NR may also form part of the diradical R' as for example in the polyethylene glycols, in diethanolamine, and in diethanolethylamine. Since the reactivity of the hydroxyl groups is greatest if they are primary and least if they are tertiary, compounds having primary hydroxyl groups are to be preferred to those having secondary groups and those having secondary groups are to be preferred to those having tertiary hydroxyl groups. Examples of suitable glycols include ethylene glycol, diethylene glycol, triethylene glycol, hexamethylene glycol, 1,3-butylene glycol, etc. Higher polyols such as glycerin, erythritol, pentaerythritol, sorbitol, 1-thiosorbitol, glucose, alpha-methyl glucoside can also be used but, as is to be expected, the products while useful are probably not linear and their use may result in the formation of products of low solubility in water.

Organic compounds suitable for modifying the polymers and containing at least one labile hydrogen atom, i. e., hydrogen directly attached to oxygen, nitrogen or sulfur, and at least 8 carbon atoms include the alcohols, monoglycerides, alkyl phenols, for example, secondary dodecyl phenol, amides, ureides, N-substituted ureas such as N-octylurea, N-substituted anilines such as N-dodecylaniline, sulfonamides, thiols, thioethers such as 1-dodecylthiosorbitol, acids, methylolamides, monoalkyl glyceryl ethers, esters of hydroxyacetic acid, etc. In general the mono-functional compounds are preferred. The monosulfonamides are preferred since they condense rapidly to yield products of good solubility in water.

The catalyst used varies considerably with the stability and basicity of the polymer ingredients. In many cases no catalyst is required. However, the use of a catalyst reduces materially the reaction time, and the reaction may be carried out successfully at slightly elevated temperatures. Basic ingredients require acidic catalysts while some neutral monomers such as bis(methoxymethyl)urea which undergo troublesome cross-linking reactions at high temperatures in the presence of strong acid catalysts can be condensed with glycols without the use of catalysts. Strong acids, materials easily converted to strong acids, salts of strong acids and weak bases, and trialkylsulfonium iodides and sulfates are catalysts for this reaction. These catalysts may be designated as acetal-forming or acetal-interchange catalysts. Specific catalysts include sulfuric acid, hydrochloric acid, phosphoric acid, p-toluene sulfonic acid, dimethyl sulfate, diethyl methyl sulfonium methylsulfate, methylphenyl octadecyl sulfonium methylsulfate, iodine, ammonium chloride, zinc chloride, magnesium bromide, diethylmethyl sulfonium iodide and dodecyldimethyl sulfonium iodide. It is frequently desirable to prepare the water soluble condensation products without catalysts. Aqueous solutions or dispersions of these products including a small amount of one of the above mentioned catalysts are then employed to impregnate fibrous materials such as paper, cloth, wood, etc. The impregnated material is then heated at an elevated temperature to insolubilize the product and produce unique water-resistant finishes.

The temperature at which the polymerization reaction is carried out varies with the stability of the reactants involved. Since the rate of condensation increases with increasing temperature it is usually advantageous to use as high a temperature as is possible without decomposition or other unfavorable side reactions. In general the temperature lies between about 50° C. and 250° C. with the optimum temperature between about 80° C. and 200° C. In order to prevent loss of volatile reactants and to avoid heating at very high temperatures the initial stages of the polymerization may be carried out at a relatively low temperature and the later stages at a higher temperature. The maximum temperature employed is dependent upon the catalyst used since it has been observed that polymers which are stable in the absence of catalysts at 180° C. become insoluble at this temperature if a trace of such catalysts as ammonium chloride are present.

Since the polymerization takes place by a reversible reaction it is desirable that the alcohol formed be removed as completely as possible from the reaction mixture in order to minimize the reaction time. This is accomplished conveniently by heating the polymerization mixture under reduced pressure especially during the latter stages of the cycle. The same effect can also be obtained by passing an inert gas through the hot reactants to carry off the alcohol as it is formed. The latter method is effective at atmospheric, subatmospheric or superatmospheric pressure. A similar method is to use an inert liquid such as toluene as the solvent. The solvent is refluxed in a column and the lower boiling alcohol removed from the top of the column by distillation.

Additional information concerning the conditions of reaction and the individual reactants suitable for use is set forth in detail in the copending application, Serial Number 464,244, filed by the present applicants on November 2, 1942, and entitled, "Condensation products and processes for their production." By using the diamide derivatives previously described herein in place of the heteromonocyclic urea derivatives described in that application the instructions thereof become applicable hereto.

The new compositions disclosed in this invention which have a modifying radical of 8 or more carbon atoms belong to the class of capillary-active materials in that they have colloidal properties and therefore may be advantageously used in any process involving wetting, penetrating, deterging, dispersing, emulsifying, frothing, foaming, and kindred phenomenon. These compositions may be employed in pure or standardized form and if desired in conjunction with known processing or treating agents. They may be used by themselves or in combination with other surface-active agents in any relation in which surface-active agents having colloidal properties have heretofore been used in the textile, leather, lacquer, paper, rubber and like industries. A few of the more important uses of these new products as textile assistants will be mentioned in order that the importance and widespread applicability of these new products in the textile industry may be fully appreciated. They may be used alone or in combination with suitable detergents for cleansing and scouring vegetable and animal fibers when removing fatty or oily materials or in general in place of soap for cleansing operations. They may advantageously be employed as cleansing agents in hard water. The products have capillary active properties of different degree depending upon the nature and the length of the water solubilizing polymer chain and the consequent degree of solubility and dispersing power in water. Furthermore, the nature and length of the modifying radical also contributes its influence on the degree of solubility and dispersing power in water. These products are useful as auxiliary agents for various purposes in the dyeing industry, for instance as dyeing agents, leveling assistants and the like. The new products may be used with agents preventing the precipitation on the fiber of insoluble inorganic salts caused by the hardness of the water. If desired they may be used in admixture with adjuvants, for instance water soluble salts of phosphoric acids such as alkali pyrophosphates or alkali metaphosphates, other inorganic salts for instance those used for altering the pH value of the mixture such as sodium carbonate, sodium silicate, or pure diluents such as sodium sulfate or sodium chloride, bleaching agents or the like.

As many widely different embodiments of this invention may be made without departing from the spirit and scope thereof, it is to be understood that the invention is not limited to the specific embodiments thereof except as defined in the appended claims.

We claim:

1. A process for preparing water-soluble condensation products which comprises reacting at 50° C. to 250° C. an N,N'-bis (alkoxymethyl) urea with a glycol and a monosulfonamide of a straight chain hydrocarbon having from about thirteen to about twenty carbon atoms.

2. A process for preparing water-soluble condensation products which comprises reacting at 50° C. to 250° C. bis(methoxymethyl)urea with a glycol and a monosulfonamide of a straight chain hydrocarbon having from about thirteen to about twenty carbon atoms.

3. A process for preparing a water-soluble condensation product which comprises reacting at about 100° C. bis(methoxymethyl)urea with diethylene glycol and a monosulfonamide of a straight chain hydrocarbon having from about thirteen to about twenty carbon atoms.

4. Products produced in accordance with the process defined in claim 1.

5. Products produced in accordance with the process defined in claim 2.

6. Products produced in accordance with the process defined in claim 3.

WILLIAM J. BURKE.
JAMES H. WERNTZ.